US009792835B2

(12) United States Patent
Joshi et al.

(10) Patent No.: US 9,792,835 B2
(45) Date of Patent: Oct. 17, 2017

(54) PROXEMIC INTERFACES FOR EXPLORING IMAGERY

(71) Applicant: Microsoft Technology Licensing, LLC, Redmond, WA (US)

(72) Inventors: Neel S. Joshi, Seattle, WA (US); Meredith J. Morris, Bellevue, WA (US); Kyle Rector, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/017,269

(22) Filed: Feb. 5, 2016

(65) Prior Publication Data

US 2017/0229040 A1 Aug. 10, 2017

(51) Int. Cl.
*G09B 21/00* (2006.01)
*G06F 3/01* (2006.01)

(52) U.S. Cl.
CPC ............ *G09B 21/007* (2013.01); *G06F 3/011* (2013.01)

(58) Field of Classification Search
CPC .... G09B 21/00; G09B 21/006; G09B 21/009; G09B 21/003; G09B 21/007; G09B 21/001; G09B 9/22; G09B 9/308; G09B 9/326
USPC ....................................................... 340/4.13
See application file for complete search history.

(56) References Cited

U.S. PATENT DOCUMENTS

| | | | | |
|---|---|---|---|---|
| 4,322,744 A | * | 3/1982 | Stanton | G09B 21/006 348/62 |
| 6,963,656 B1 | * | 11/2005 | Persaud | G09B 21/006 348/62 |
| 8,797,386 B2 | | 8/2014 | Chou et al. | |
| 9,232,183 B2 | * | 1/2016 | Yarosh | H04N 7/15 |
| 2005/0208457 A1 | * | 9/2005 | Fink | G09B 21/00 434/112 |
| 2007/0211947 A1 | * | 9/2007 | Tkacik | G09B 21/006 382/232 |
| 2008/0309913 A1 | * | 12/2008 | Fallon | A61H 3/061 356/4.01 |

OTHER PUBLICATIONS

"Body Tracking", Retrieved on: Dec. 14, 2015, Available at: https://msdn.microsoft.com/en-us/library/dn799273.aspx.
Cavaco, et al., "Color Sonification for the Visually impaired", In Journal Procedia Technology, vol. 9, Dec. 31, 2013, pp. 1048-1057.
Dingler, et al., "Interaction Proxemics: Combining Physical Spaces for Seamless Gesture Interaction", In Proceedings of the 4th International Symposium on Pervasive Displays, Jun. 10, 2015, pp. 107-114.
Ghiani, et al., "Supporting Orientation for Blind People Using Museum Guides", In Proceedings of Extended Abstracts on Human Factors in Computing Systems, Apr. 5, 2008, pp. 3417-3422.
Jin, Hulliang, "Proxernic interaction and Migratable user Interface: Applied to Smart City", In Thesis submitted at University of Lyon, Oct. 15, 2014, 159 pages.

(Continued)

*Primary Examiner* — Mark Blouin

(57) ABSTRACT

The techniques discussed herein facilitate detecting a position of an object; identifying a feedback type associated with the position, the feedback type being an image interpretation tool; producing a signal associated with an image, the signal being of the feedback type identified.

20 Claims, 10 Drawing Sheets

(56) References Cited

OTHER PUBLICATIONS

Mengucci, et al., "Image Sonification Application to Art and Performance", Retrieved on: Dec. 10, 2015, Available at:http://:users.fba.up.pt/~mc/ICLI/mengucc.pdf.
Nagarajan, et al., "Role of object identification in sonification system for visually impaired", In Conference on Convergent Technologies for the Asia-Pacific Region, vol. 2, Oct. 15, 2003, pp. 735-739.
Quinn, Marty, "A MoveMusic Demonstrations by Marty Quinn of Design Rhythmics Sonification Research Lab", Published on: Jan. 2, 2013 Available at: http://www.drsrl.corn/movemusic/.
Reeves, et al., "Designing Interfaces for Public Places", Published on: Oct. 17, 2015 Available at: https://www.blasttheory.co.uk/wp-content/uploads/2013/02/research_designing_interfaces_for_public_places.pdf.
Ribeiro, et al., "Auditory Augmented Reality: Object Sonification for the Visually impaired", In IEEE 14th International Workshop on Multimedia Signal Processing, Sep. 17, 2012, pp. 319-324.
Sanz, et al., "Scenes and Images into Sounds: a Taxonomy of Image Sonification methods for Mobility Applications", In Journal of the Audio Engineering Society, vol. 62, issue 3, Mar. 2014, pp. 1-12.
Vermeulen, et al., "Proxemic Flow: Dynamic Peripheral Floor Visualizations for Revealing and Mediating Large Surface Interactions", In Proceedings of 15th IFIP TC. 13 International Conference on Human-Computer Interaction, Sep. 14, 2015, pp. 1-18.

\* cited by examiner

PROXEMIC INTERFACES FOR EXPLORING IMAGERY

BACKGROUND

The arts are an important component of participation in cultural activities, but remain an unaddressed challenge for people with disabilities. Paintings and photography in particular are often inaccessible to people who are blind or low vision due to the inherently visual nature of paintings and photography. Existing customized solutions to allow those who are blind or low vision to experience visual imagery are costly, require large amounts of curator time, and do not adequately allow for personal discovery, interpretation, and an experience that imitates the sighted version of these works.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques to provide a proxemic interface for exploring images. As used herein, "image" refers to any visual imagery, whether it exists in a form that is comprehensible visually (e.g., a photograph, painting, mural, display, etc.) or not comprehensible visually (data stored in memory corresponding to a humanly-comprehensible visual).

Examples described herein provide techniques to facilitate exploration and interpretation of images by low-vision and/or blind persons through a proxemic interface. The techniques described herein can provide an experience that varies with a user's position and/or movements relative to an image or other point. In particular, to imitate a sighted exploration and interpretation of images, signals provided to a user of the techniques can vary in detail and/or type relative to a position of a user and/or a portion of the user.

In at least one example, the user can move closer or further from the image and correspondingly receive signals by the techniques with more and less detail, respectively. The experience can include humanly-perceptible signals such as audio feedback, for example, background music, image sonification, image element sound effects, image description, etc. The proxemic interface can also additionally or alternatively include other humanly perceptible signals such as haptics.

The techniques described herein can be implemented in a number of ways. Example implementations are provided below with reference to the following figures. The implementations, examples, and illustrations described herein can be combined.

The term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

Illustrative Environment

Figure 1:
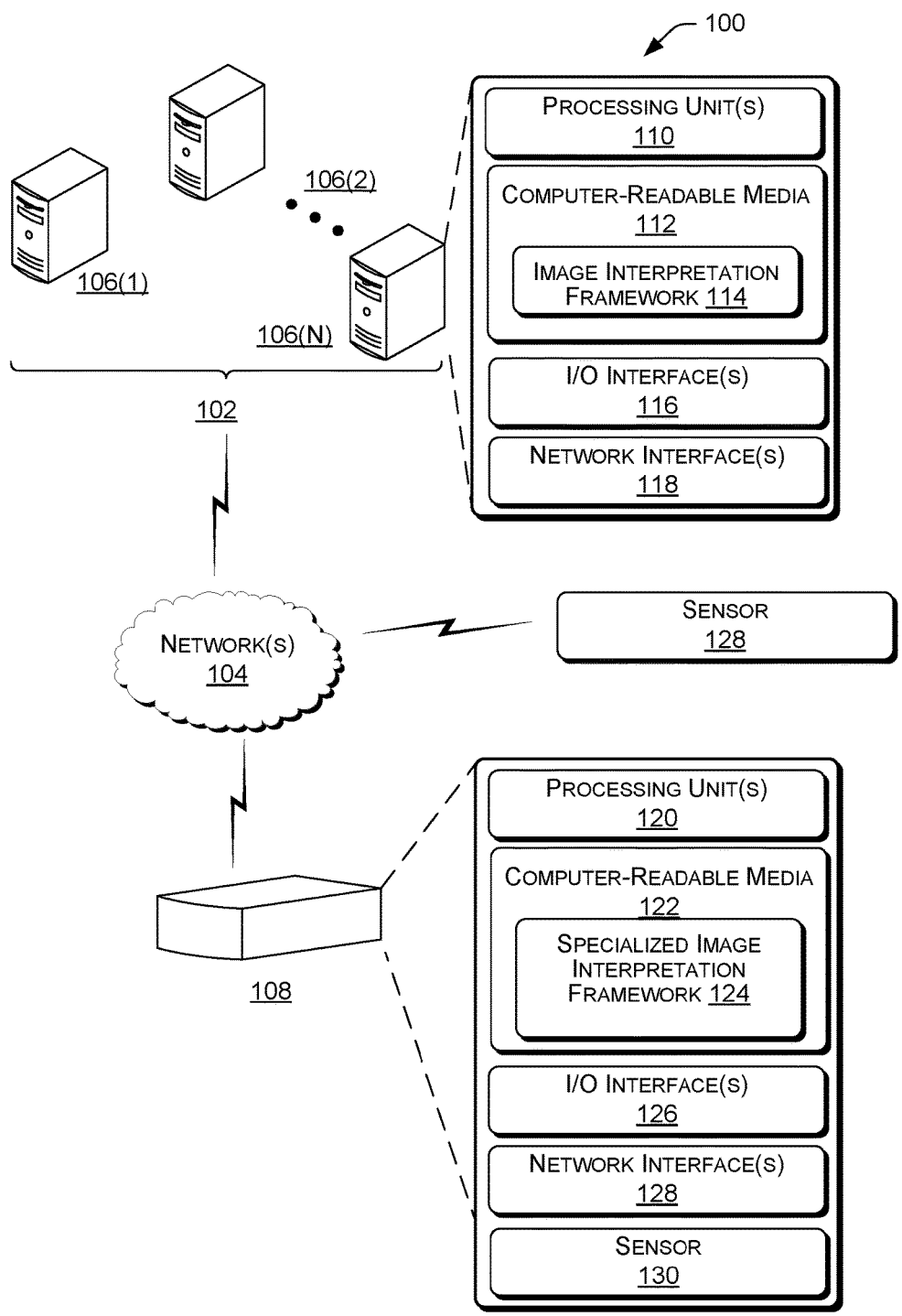
FIG. 1 is a block diagram depicting an example environment in which examples of an image interpretation framework can operate.

FIG. 1 is a block diagram depicting an example environment 100 in which examples described herein can operate. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), and/or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, distributed computing resource(s) 102 includes computing devices such as devices 106(1)-106(N). Examples support scenarios where device(s) 106 can include one or more computing devices that operate in a cluster and/or other grouped configuration to share resources, balance load, increase performance, provide failover support and/or redundancy, and/or for other purposes. Although illustrated as desktop computers, device(s) 106 can include a diverse variety of device types and are not limited to any particular type of device. Device(s) 106 can include specialized computing device(s) 108.

For example, device(s) 106 can include any type of computing device having one or more processing unit(s) 110 operably connected to computer-readable media 112, I/O interfaces(s) 116, and network interface(s) 118. Computer-readable media 112 can have an image interpretation framework 114 stored thereon. Also, for example, specialized computing device(s) 108 can include any type of computing device having one or more processing unit(s) 120 operably connected to computer-readable media 112, I/O interface(s) 126, and network interface(s) 128. Computer-readable media 112 can have a specialized computing device-side specialized image interpretation framework 124 stored thereon.

The system can further include a sensor 128 communicatively coupled to the network(s) 104. In various examples, the sensor 128 can be integrated into the computing devices 106(1)-(N) and/or specialized computing device(s) 108. The sensor 128 can be any sensor appropriate for directly and/or indirectly sensing the position of an object such as, for example, a camera and corresponding instructions stored on computer-readable media at the sensor 128, the computing devices 106(1)-(N), and/or the specialized computing device(s) 108 that equip processing unit(s) to perform acts comprising position and/or depth sensing based on data from the camera. In some examples, the sensor 128 may be one or more of pressure sensors, a global positing system, a system for wireless network triangulation, a sonar system, a wearable, a gyroscope, a depth sensor, a system for range imaging, a sensor capable of gaze tracking, Microsoft Kinect, etc.

Figure 2:
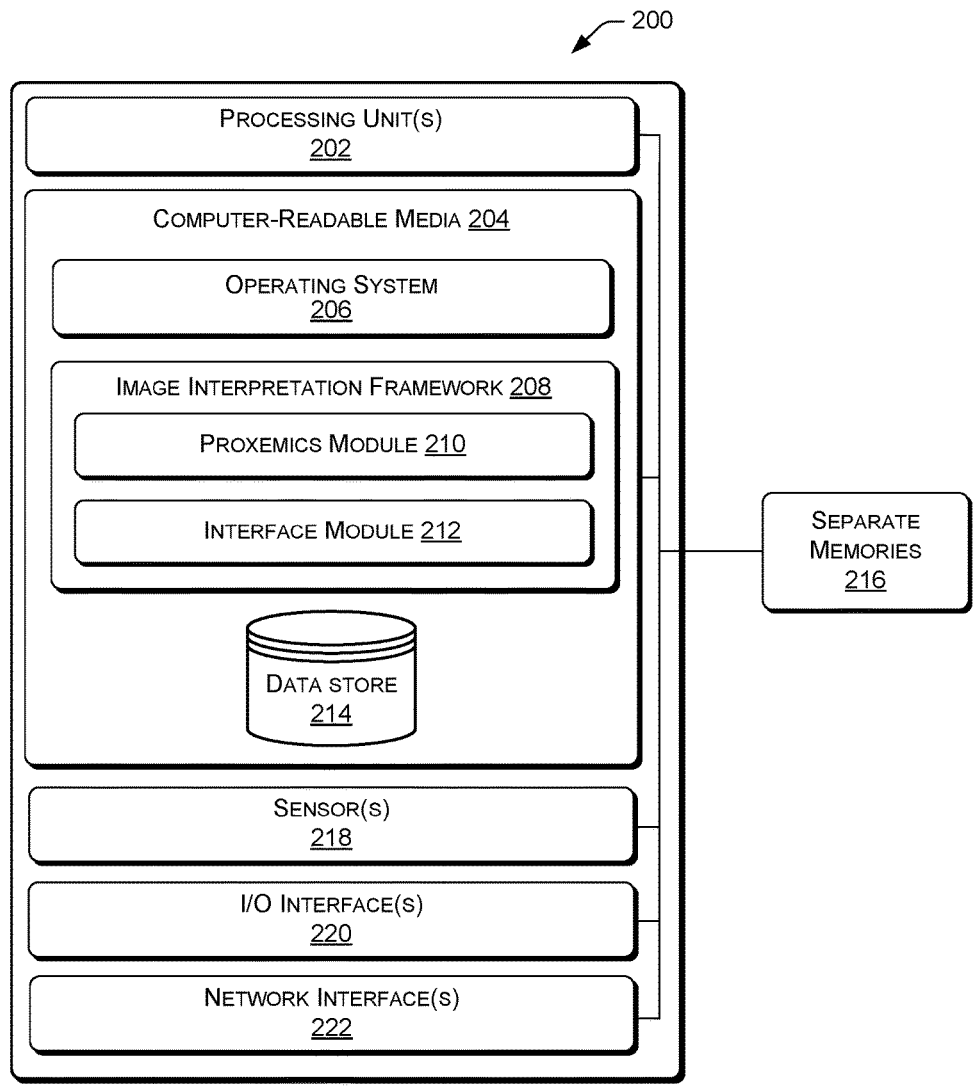
FIG. 2 is a block diagram depicting an example device that can implement image interpretation, according to various examples.

FIG. 2 depicts an illustrative device 200, which can represent device(s) 106 and/or 108. Illustrative device 200 can include any type of computing device having one or more processing unit(s) 202, such as processing unit(s) 110 and/or 120, operably connected to computer-readable media 204, such as computer-readable media 112 and/or 122. Processing unit(s) 202 can represent, for example, a CPU incorporated in device 200. The processing unit(s) 202 can similarly be operably connected to computer-readable media 204.

The computer-readable media 204 can include, at least, two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. The computer-readable media 112 and the computer-readable media 122 can be examples of computer storage media. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media can embody computer-readable instructions, data structures, program modules, and/or other data in a modulated data signal, such as a carrier wave, and/or other transmission mechanism. As defined herein, computer storage media does not include communication media.

Device 200 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as CPU-type processors (e.g., micro-processors), GPUs, and/or accelerator device(s).

In some examples, as shown regarding device 200, computer-readable media 204 can store instructions executable by the processing unit(s) 202, which can represent a CPU incorporated in device 200. Computer-readable media 204 can also store instructions executable by an external CPU-type processor, executable by a GPU, and/or executable by an accelerator, such as a Field Programmable Gate Array (FPGA)-type accelerator, a digital signal processing (DSP)-type accelerator, and/or any internal or external accelerator.

Executable instructions stored on computer-readable media 202 can include, for example, an operating system 206, an image interpretation framework 208, and other modules, programs, and/or applications that can be loadable and executable by processing units(s) 202. The image interpretation framework 208 can include proxemics module 210 and interface module 212. Alternatively, or in addition, the functionally described herein can be performed, at least in part, by one or more hardware logic components such as accelerators. For example, and without limitation, illustrative types of hardware logic components that can be used include FPGAs, Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU core embedded in an FPGA fabric.

In the illustrated example, computer-readable media 204 also includes a data store 214. In some examples, data store 214 includes data storage such as a database, data warehouse, and/or other type of structured or unstructured data storage. In some examples, data store 214 includes a relational database with one or more tables, indices, stored procedures, and so forth to enable data access. Data store 214 can store data for the operations of processes, applications, components, and/or modules stored in computer-readable media 204 and/or executed by processor(s) 202, and/or accelerator(s), such as proxemics module 210 or interface module 212. For example, data store 214 can store version data, iteration data, clock data, and other state data stored and accessible by the image interpretation framework 208. Alternately, some or all of the above-referenced data can be stored on separate memories 216 such as a memory on board a CPU-type processor (e.g., microprocessor(s)), memory on board a GPU, memory on board an FPGA type accelerator, memory on board a DSP type accelerator, and/or memory on board another accelerator).

The device 200 can further include a sensor 218. In some examples, the sensor 218 can be integrated into a computing device 106(1)-(N) and/or a specialized computing device(s) 108. The sensor 218 can be any sensor appropriate for directly and/or indirectly sensing the position of an object such as, for example, a camera and corresponding instructions stored on computer-readable media 204 that equip the processing unit(s) 202 to perform acts comprising position and/or depth sensing based on data from the camera. In some examples, the sensor 218 may be one or more of pressure sensors, a global positing system, a system for wireless network triangulation, a sonar system, a wearable, a gyroscope, a depth sensor, a system for range imaging, a sensor capable of gaze tracking, a Microsoft Kinect, etc.

Device 200 can further include one or more input/output (I/O) interface(s) 220, such as I/O interface(s) 116 and/or 126, to allow device 200 to communicate with input/output devices such as user input devices including peripheral input devices (e.g., a keyboard, a mouse, a pen, a game controller, a voice input device, a touch input device, a gestural input device, Kinect, and the like) and/or output devices including peripheral output devices (e.g., a display, a printer, audio speakers, a haptic output, bone conduction for audio sensation, and the like). In at least one example, the I/O interface(s) 220 can be used to communicate with a sensor 128, whether the sensor 128 is integrated into the device 200 or is a peripheral. Device 200 can also include one or more network interface(s) 222, such as network interface(s) 118 and/or 128, to enable communication between computing device 200 and other networked devices such as device(s) 106(1)-(N) or 108 and/or to enable communication between sensor 218 via network interface(s) 222. Such network interface(s) 222 can include one or more network interface controllers (NICs) and/or other types of transceiver devices to send and receive communications over a network.

FIG. 2 includes an illustrative image interpretation framework 208 that can be distributively or singularly stored on device 200, which, as discussed above, can include one or more devices such as device 108 and/or distributed computing resources 102. Some or all of the modules can be available to, accessible from, or stored on a remote device, such as a cloud services system or distributed computing resources 102, and/or device(s) 106. In at least one example, an image interpretation framework 208 includes modules 210 and 212 as described herein that provide spatial and/or virtual proximity detection, by the proxemics module 210, and an interactive and information interface, by the interface module 212. In some examples, any number of modules could be employed and techniques described herein as employed by one module can be employed by a greater or lesser number of modules.

In at least one example, proxemics module 210 includes computer-executable instructions capable of configuring processing unit(s) 202 to detect the position of an object. In some examples, the object can be a person and/or a portion of a person such as, for example, hand(s), finger(s), gaze, and/or feet. The instructions can configure the processing unit(s) 202 to detect multiple types of positions at once. For example, the device 200 can be configured to detect both a general position of a person's body and a position of the person's hand(s). The device 200 can be further configured to store in the data store 214 positions of an object over time (e.g., to track an object). In various examples, the object can be a virtual representation of a user and/or a virtual position within a 3-dimensional virtual world. In some examples, the position can be a two-dimensional position, such as, for example, a position along a progress bar, level of detail, and/or timeline. In at least one example, the proxemics module 210 can be configured to receive input from the sensor 128 and/or a sensor 218 of the device 200. The proxemics module 210 can receive input from other I/O devices such as, for example, a keyboard, mouse, touchscreen, etc.

In at least one example, the interface module 212 includes computer-executable instructions capable of configuring processing unit(s) 202 to provide a variety of interfaces, such as, for example, humanly-perceptible signals that allow low-vision and/or blind persons to explore, interact with, and interpret images in a manner modeled after the manner of sighted persons. In some examples, the techniques can be used to augment a sighted user's interaction with an image. Due to the nature of sight, sighted individuals may receive only an impression of an image from a distance and may receive more detail about the image as they approach it or, in the digital world, as the individual selects and/or zooms in on an image. In museums where images are curated, such as, for example, paintings and/or photographs, information about the image may be read by an individual desiring more information about the image by moving close enough to the image to read a placard.

In at least one example of proxemic interfaces for exploring imagery, the proxemic module 210 and the interface module 212 can function together to present an interface to an individual in which the interface module 212 changes with the user's position relative to the image detected by the sensor 218 and processed by the proxemic module 210. Since, in at least one example, the proxemic interface is configured to assist low-vision and/or blind persons, the position may be relevant to an arbitrary and/or virtual point rather than to a physical image and/or representation of an image. In some examples, the interface module 212 can configure processing unit(s) 202 to produce a variety of signals to be output through the 1/O interface(s) 220 to various I/O devices. In at least one example, the signals can include audio signals. In some examples, the signals can include haptics, such as, for example, changes in temperature, humidity, and/or air movement; and/or any haptic feedback an I/O device may output to simulate literal and/or aesthetic features of an image.

In at least one example, the audio signals can include one or more of music and/or sounds corresponding to a mood of the image, sonification of the image, sound effects corresponding to elements in the image, and/or information regarding and/or describing the image. In some examples the interface module 212 can produce audio signals that help convey literal and/or aesthetic features of images.

Illustrative Environment

Figure 3:
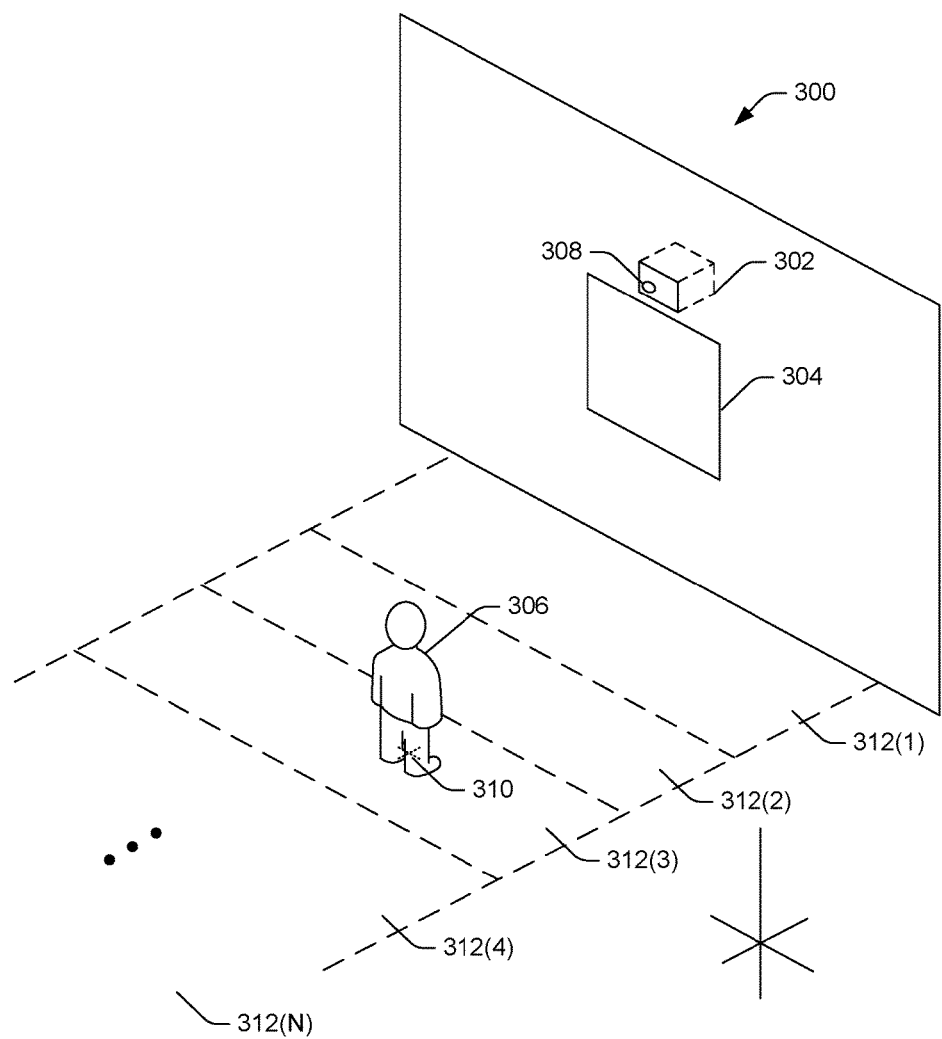
FIG. 3 is an example environment employing a proxemic interface for image interpretation.

FIG. 3 is an illustrative environment 300 in which the techniques can be employed. The illustrative environment 300 can include a device 302, such as a device 200 that implements a proxemic interface. The illustrative environment 300 can further include an image 304. In at least one example, the image 304 can include a painting, a photograph, and/or a digital reproduction of an image such as, for example, a digital display reproducing an image and/or a wall upon which an image is projected. In various examples, the image 304 can be any visually perceptible signal or manifestation. The device 302 can be configured to identify the position of the image 304. In some examples, the image 304 is not displayed. In these examples, the device can identify a point in space and/or virtual space upon which to base position of an object 306. In at least one example, that point can be a position of a sensor of the device 302 (e.g., the position of the object 306 can be measured relative to the sensor such as nearer or further from the sensor).

In at least one example, the object 306 can be a person and/or a portion of a person such as, for example, a person's hand(s), head position, and/or gaze, and/or object(s) held by the person. In some examples, the object 306 can include a virtual position of an individual in a virtual environment and/or a point of progress within successive tasks (e.g., wherein the feedback varies based upon sequential progress such as using the left and right arrow keys and/or clicks on a keyboard to receive different feedback, imitating the way an individual approaches a physical image from a distance). For example, pushing a keyboard key (e.g., pushing the right arrow key) and/or swiping a touchscreen in one direction (e.g., swipe right) could be interpreted by a proxemics module 210 to advance the object 306 closer to the image 304 to cause different forms of feedback from the interface module 212. Pushing a different keyboard key (e.g., pushing the left arrow key) and/or swiping a touchscreen in an opposite direction (e.g., swipe left) could cause the proxemics module 210 to interpret the input as moving the object 306 away from the image 304 and to cause a previous form of feedback from the interface module 212.

The device 302 can be configured to receive input from multiple objects 306, such as multiple persons and/or multiple portions of persons, and for multiple images 304. For example, a proxemics module 210 of a device 302 can be configured to detect the position of multiple objects 306, such as multiple persons and/or multiple portions of persons, and can have positions of a variety of images 304 stored in a memory of the device 302. In at least one example, the proxemics module 210 can be configured to detect three-dimensional positions of the objects 306 such that the proxemics module 210 can detect whether an object 306 is in front of a particular image of the images. In some examples, the proxemics module 210 can project a two or three-dimensional matrix modeling space occupied by the object 306 and project the occupied space matrix to a one or two-dimensional matrix of space, respectively, in order to obtain an accurate position of the object in one or two dimensions, respectively. In various examples, the proxemics module 210 can use an average, median, and/or other appropriate functions to calculate a reliable position of the object 306. In various examples, the proxemics module 210 can be configured to detect a position of a bottom of the object 306 that is in contact with a floor and/or virtual floor (e.g., feet, wheel chair contact with the ground, virtual feet, etc.). Depending on the three-dimensional position of the object 306, the interface module 212 can change the image 304 for which the interface module 212 provides feedback. For example, the proxemics module 210 of the device 302 can detect that an individual is standing in front of a particular image of a group of images so the interface module 212 can accordingly provide feedback based on the particular image of the group of images.

In some examples, the proxemics module 210 can detect an incorrect orientation of the object 306 and the interface module 212 can intervene. For example, if the object 306 is a low-vision and/or blind person that twists to one side and/or takes a path that will diverge from substantially in front of the image 304, the proxemics module 210 can sense the orientation and the interface module 212 can provide a signal to the person to help focus the person's orientation. In at least one example, the signal can include an audio signal and/or indicate a direction in which the image 304 lies. For example, the interface module 212 can provide an audio and/or a haptic signal on a side of the individual that leads them towards the image 304.

In at least one example, a sensor 308 of the device 302 can be integrated into the device 302 itself, as FIG. 3 depicts. In some examples, the sensor 308 can include a network of sensors such as, for example, pressure sensors in a floor of the illustrative environment 300, depth-sensing cameras, sonar radios, wireless internet network nodes that can be used to triangulate a position of an object 306 by Wi-Fi connectivity of the object 306, a system of RFID tags at the object 306 and RFID readers, etc. In some examples, the system can be disposed at one or more of the object 306, local to the object 306, in portions of the illustrative environment 300, at the device 302, at the image 304, and/or at any other appropriate location. In a virtual implementation of the techniques, the sensor 308 can include a module that relays a virtual position to the interface module 212. Ultimately, the sensor 308 can represent any sensor and/or group of sensors that is capable of providing a position of the object 306 to the interface module 212 of the device 302.

In at least one example, the interface module 212 of the device 302 can vary the feedback the interface module 212 produces based at least in part on a position of the object 306 detected by the proxemics module 210 of the device 302 (e.g., detected position 310). For example, the interface module 212 of the device 302 can produce different signals associated with the image 304 (e.g., signals that help convey the literal and/or aesthetic features of the image 304) depending on whether the detected position 310 of the object 306 is within a defined zone 312(1)-312(N). FIG. 3 depicts four zones 312(1)-310(4), however, the interface module 212 can define any number of zones (310(N)) and, in some examples, the zones can include gradients that provide mixed and/or continuously varying feedback as the detected position of the object 306 changes. In some examples, as few as one zone can be defined. For example, in a discrete zone example, the interface module 212 can provide a first type of feedback when the detected position of the object 310 is within zone 312(1) and a second type of feedback when the detected position of the object is within zone 312(2) and so on as the detected position 310 moves through the other zones 312(3)-312(N). In a gradient zone example, as the detected position of the object 310 moves away from a middle of zone 312(1) and towards the edge of zone 312(2), the interpretation module can produce less of an amount of and/or decrease an amplitude of the first type of feedback and produce more of and/or increase the amplitude of the second type of feedback and so on through the other zones 312(3)-312(N).

In at least one example, the interface module 212 can produce a signal that provides impressionistic feedback when the detected position 310 is within the furthest zone 312(N) (or zone 312(4) in FIG. 3, which depicts one example of the techniques that employs four zones). For example, the interface module 212 can produce a signal to I/O devices to convey general verbal information regarding the image 304 if the detected position 310 is within the furthest zone 312(N) (or zone 312(4) in FIG. 3). In various examples, the interface module 212 can produce background music corresponding to a mood of the image 304 when the detected position 310 is within the furthest zone 312(N) (or zone 312(4) in FIG. 3). In some examples, the interface module 212 could reproduce hashtags and/or descriptive words found from text and/or hashtag crawling social media such as Twitter and/or Instagram, for example. In some examples, the interface module 212 can produce any generalized information regarding the image 304.

In at least one example, the interface module 212 can produce a signal that provides more detailed information about the literal and/or aesthetic features of the image 304 as the detected position 310 is in zones closer to the image 304. For example, when the detected position 310 moves from zone 312(4) to zone 312(3), the interface module 212 can transition the type of signal produced for zone 312(4) to a second type of signal corresponding to zone 312(3). The second type of signal can be, for example, sonification of the image 304. In gradient zone examples where the interface module 212 produces background music corresponding to a mood of the image 304, as the detected position 310 moves away from zone 312(4) and towards zone 312(3), the background music can fade and the movements of the object 306 and/or portions of the object 306 can start to cause sonification of the image with increasing volume. In order to accomplish this functionality, in some examples, the proxemics module 210 can detect both the position of the object 306 and a position of a portion of the object 306 (e.g., the proxemics module 210 can track a person and the person's hand(s), feet, etc.).

In at least one example, as the detected position 310 moves into zone 312(2), the interface module 212 can produce a signal corresponding to elements of the image 304, such as things and/or people depicted. For example, the interface module 212 can produce onomatopoeic audio signals that correspond to the object that makes the onomatopoeic sound (e.g., chirping for a bird, mooing for a cow, etc.). In various examples, the interface module 212 can produce audio signals that are commonly associated with an element of an image (e.g., rustling of wind through leaves for a tree, waves crashing for the ocean, keyboard strikes for an office, etc.).

In some examples, as the detected position 310 moves into zone 312(1), the interface module 212 can produce a signal conveying detailed information regarding the image. The information, in at least one example, can be literal information such, for example, date created, authorship, background information, technique information, media information, critical reception, importance within history, etc. In various examples, the information can focus on aesthetics such as an explanation of balance of the picture, the role positioning and/or lighting plays, explanation of the complexity or lack thereof, etc.

In at least one example, when the detected position 310 is in zone 312(4), the interface module 212 can provide a verbal description of the image 304; when the detected position 310 is in zone 312(3), the interface module 212 can provide music associated with a mood of the image 304; when the detected position 310 is in zone 312(2), the interface module 212 can provide sonification of the image 304; and when the detected position 310 is in zone 312(1), the interface module 212 can produce a signal corresponding to elements of the image 304. Any combination of these, additional, or less feedback is contemplated.

The zones can be of any shape or dimensions. In at least one example, the zones can be six feet by twelve foot spaces. In some examples, the zone closest to the image 304 can be six feet deep as measured from the image 304 and subsequent zones can be three feet deep until the last zone which may be any point further from the back side of the second-to-last zone. As discussed above, in some examples, the zones can be gradients without defined borders.

Illustrative Sonification Diagram

Figure 4:
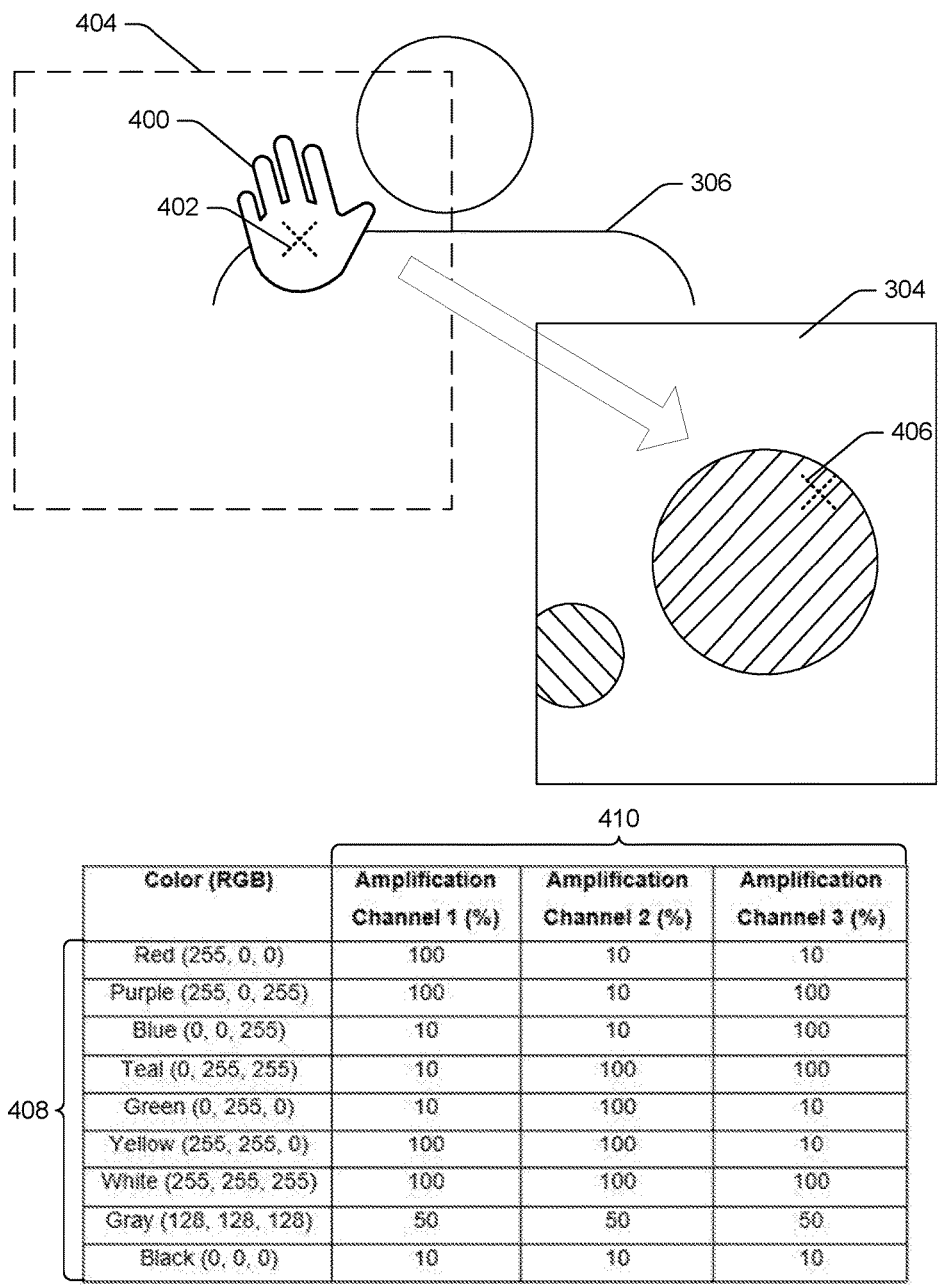
FIG. 4 is a diagram illustrating an example environment of image sonification.

FIG. 4 depicts a diagram and table corresponding to an illustrative image sonification environment. In at least one example, the interface module 212 can implement image sonification when an object 306 is at a position or within a range of positions (e.g., a zone) as identified by the proxemics module 210.

In at least one example, the proxemics module 210 can detect a portion 400 of the object 306 such as hand(s), gaze, head position, feet, etc. FIG. 4 illustrates one example in which the proxemics module 210 can detect the position 402 of a hand of an individual. In some examples, the proxemics module 210 can track the position of a user's finger on a screen and/or touch pad. For example, an infrared and/or visible light spectrum camera can be used to detect the position 402. In various examples, the camera detects objects within a three-foot by three-foot square, as FIG. 4 depicts at 404, modeling the approximate range of a hand from an individual's shoulder. In some examples, the size of the range of detection 404 can be a square having a diameter twice the size of a dimension of an individual, such as, for example, the individual's arm length, stance, and/or head size. In some examples, the size and shape of the range of detection 404 can be the size and shape of the image 304. However, any suitable range of detection can be used depending on the type of object 306 and the portion 400 of object 306 being detected. The proxemics module 210 can detect gaze and therefore the range of detection 404 can be smaller.

In at least one example, the interface module 212 can correlate a detected position 402 with a location 406 of the image 304. To accomplish this, the interface module 212 can use any suitable method, such as mapping and/or projection, to correlate the detected position 402 with a correlated location 406 of the image 304. In some examples, the image 304 is resized to the size of the range of detection 404 with or without keeping the original aspect. For example, in instances where the camera detects objects within a three-foot by three-foot square and the image 304 is taller than it is wide, then the interface module 212 can map a representation of the image 304 to a height of three feet and the width less than three feet to keep the aspect ratio or the same correspondingly when the image is wider than it is tall. In some examples, the interface module 212 can display the correlated location 406 over the image 304.

To sonify the image, in at least one example, the interface module 212 produces a signal corresponding to characteristics of the correlated location 406. The characteristics can include color values in various examples (note that color values change depending on the color scheme or color space). In some examples, the characteristics can include texture characteristics. Sonification can include producing a signal based at least in part on the characteristics of the correlated location 406. In at least one example, the interface module 212 can produce an audio signal based at least in part on the characteristics of the correlated location 406. For example, the interface module 212 can amplify tracks and/or channels of music based on color values of the correlated location 406.

FIG. 4 depicts a table, reproduced herein below as Table 1 and illustrating an example technique for sonification by amplifying tracks (e.g., channels) depending at least in part on color value, with rows comprising RGB color values 408 and columns comprising corresponding factors of amplification 410 for respective channels of music.

TABLE 1

| Color (RGB) | Amplification Channel 1 (%) | Amplification Channel 2 (%) | Amplification Channel 3 (%) |
|---|---|---|---|
| Red (255, 0, 0) | 100 | 10 | 10 |
| Purple (255, 0, 255) | 100 | 10 | 100 |
| Blue (0, 0, 255) | 10 | 10 | 100 |
| Teal (0, 255, 255) | 10 | 100 | 100 |
| Green (0, 255, 0) | 10 | 100 | 10 |
| Yellow (255, 255, 0) | 100 | 100 | 10 |
| White (255, 255, 255) | 100 | 100 | 100 |
| Gray (128, 128, 128) | 50 | 50 | 50 |
| Black (0, 0, 0) | 10 | 10 | 10 |

As Table 1 illustrates the interface module 212 can use various RGB color values to determine an amplification of channels of music. For example, in a 256-color RGB color space like that used in the table, for a "Red" value (255,0,0), a first channel can receive full amplification because the red value, in the RGB scheme is at its maximum, 255. Whereas channels 2 and 3 are amplified by 10% of their maximum amplification because their corresponding values (Green and Blue) have a value of 0. A channel may not be amplified at all when the corresponding color value is 0. Furthermore, any appropriate color space or color characteristics can be used to modulate the channels. FIG. 4 illustrates an example that utilizes a 256-color RGB color space, but the interface module 212 may use other color spaces and characteristics such as CMYK, SWOP CMYK, Colormatch RGB, sRGB, Adobe RGB 1998, ProPhoto RGB, HSL, HSV, CIELAB, CIEXYZ, etc. In at least one example, the number of tuples a model contains can equal the number of channels. For example, the interface module 212 could modulate the signal using three channels for RGB, four channels for CMYK, or six channels for CIELAB (where three channels are devoted to the positive LAB values and three channels are devoted to the negative LAB values). In some examples, the interface module 212 can employ a CMYK scheme to modulate four channels, where each channel includes an audio signal composed of one of the four groups of musical instruments of the symphony orchestra; woodwinds, brass, percussion, or strings. Other representations are contemplated.

As discussed above, the interface module 212 can multiplex the feedback provided for different zones. In at least one example where the interface module 212 is configured to provide feedback comprising music corresponding to a mood of the image 304 and sonification depending on a detected position 310 of an object 306, the interface module 212 can multiplex the feedback by identifying a genre of music corresponding to a mood of the image 304 and sonifying the image 304 where the sonification modulates channels corresponding to instrument tracks of the music selected. For example, if the interface module 212 identified the genre "rock" as an appropriate genre of music to convey the mood of the image 304, the channels modulated could include a drum track, lead guitar track, rhythm guitar track, and a bass track. In some examples, the interface module 212 receives an identified genre of music corresponding to a mood of the image 304. In various examples, if the interface module 212 identified the genre "folk" as an appropriate genre of music to convey the mood of the image 304, the channels modulated could include fiddle, banjo, and percussion. Other genres can be included.

In some examples, the interface module 212 can modulate more than a signal's amplitude; the interface module 212 can modulate one or more of amplitude, pitch, tempo, duration, timbre, attack transients, vibrato, envelope modulation, and/or other sonic or musical characteristics. For example, the interface module 212 can modulate the amplitudes of audio signals based upon colors of a color value and pitch of the audio signals based on lightness of the color value or vice versa. In at least one example, the channels are channels of the same song. In some examples, the channels include instrument tracks of the same key and tempo. In various examples, the channels represent instrument tracks having a same or substantially similar tempo and chord progression or chord progressions that harmonize.

In some examples, the interface module 212 can multiplex or modulate the signal based at least in part on the detected positions of multiple objects (e.g., the detected positions of two body parts, the detected positions of multiple objects such as persons) or provide disparate multiplexed signals for multiple objects (e.g., the interface module 212 can provide one multiplexed signal to one object and a second multiplexed signal to a second object). In various examples, the interface module 212 can produce the multiplexed signals via a private channel to ones of the multiple objects.

To aid in comprehensible interpretation of an image 304 by a low-vision and/or blind user, the interface module 212 can employ various techniques such as limiting the number of audio signals the interface module 212 modulates. The interface module 212 can maintain a pitch or key of the tracks or the interface module 212 can use tracks having a same chord progression. Although the spectrum of visible light is continuous, typically humans perceive visible light generally in seven colors and two shades (e.g., red, orange, yellow, green, blue, purple, violet, black, white). In various examples, the techniques can leverage the typical human perception for meaningful interpretation of images. For example, it can be helpful to discretize colors (e.g., to segment or "bucket" the visible light spectrum into a finite number of color names) so that changes of detected position 402 produce meaningful and perceptible changes in the feedback from the interface module 212. Furthermore, meaningful image interpretation by sonification can be improved by discretization due to limitations of the human ear to perceive differences between continuously modulated audio signals or a modulation of a high number of audio signals. In some examples, the interface module 212 imitates the continuous nature of light rather than using discretization. The interface module 212 can perform a more literal or continuous sonification by modulating signals in a variety of ways to more literally sonically portray the image 304 (e.g., multiple of pitch, tempo, duration, timbre, attack transients, vibrato, envelope modulation). In various examples, the number of the channels can be increased, such as when colors are defined more specifically and therefore are higher in number (e.g., instead of an RGB scheme, combining RGB and CMYK so that a greater number of channels can be introduced to represent more specific colors).

In at least one example using discretization, the channels can be amplified based at least in part on color value and are less than or equal to four in number. In various examples, the channels can be amplified and are less than or equal to nine in number. In some examples, the channels can be amplified and are less than or equal to three in number, as FIG. 4 depicts at 410. In these and other examples, one or more of the pitch, tempo, duration, timbre, attack transients, vibrato, and envelope modulation can be maintained for one or more of the channels. In at least one example, the interface module 212 can modulate the signals solely in amplitude for maximal perceptual clarity by a user.

Illustrative Image Element Sound Effect Diagram

Figure 5:
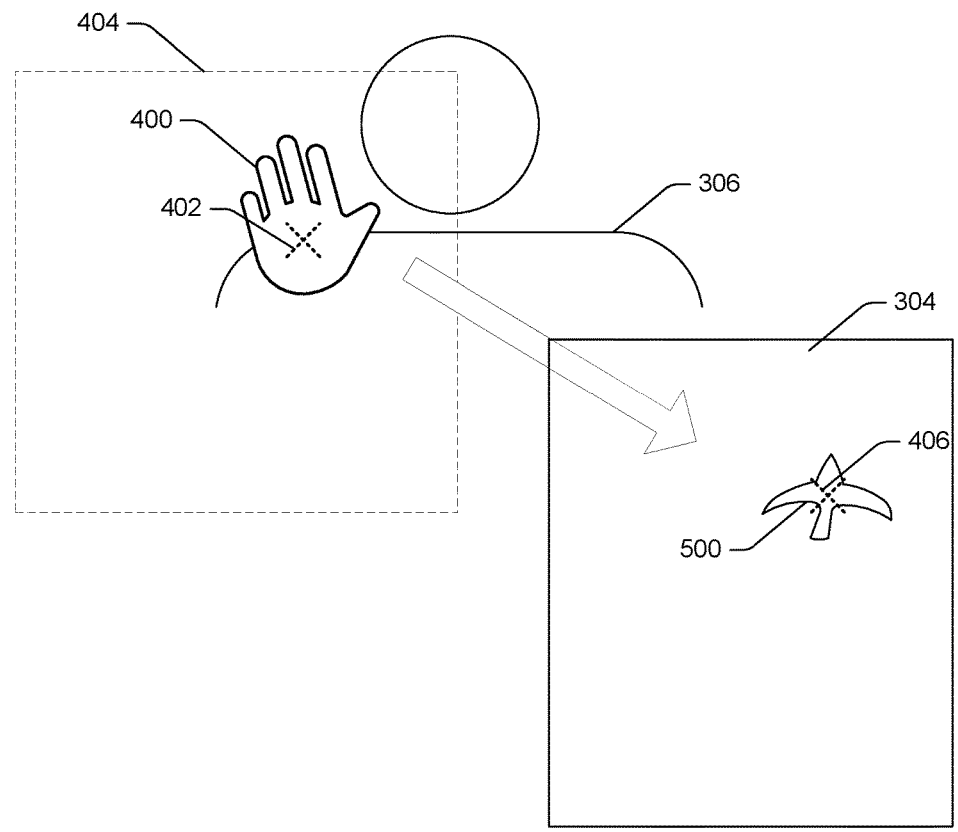
FIG. 5 is a diagram depicting an environment for producing a signal corresponding to an element of an image based on a detected position.

FIG. 5 depicts a diagram of an illustrative environment of producing a sound effect corresponding to an element 500) appearing in an image 304. In at least one example, the interface module 212 can implement image sonification when an object 306 is at a position or within a range of positions (e.g., a zone) as identified by the proxemics module 210.

The proxemics module 210 can function as described above in order to detect a position 402 of a portion 400 of an object 306 within a range of detection 404 and to correlate the detected position 402 with a location 406 within the image 304. Based on this correlated location 406 in the image 304, the interface module 212 can be configured to detect when the correlated location 406 corresponds with an element 500 appearing in the image 304 and produce a signal corresponding to the element 500. In at least one example, the signal can include an audio signal. The signals can also or alternatively include haptics, such as, for example, changes in temperature, humidity, and/or air movement; and/or any haptic feedback an I/O device may output to simulate the element 500 of an image.

In at least one example, the interface module 212 can use image segmentation techniques to identify elements of an image. For example, the interface module 212 can access a neural network in order to segment portions of the image 304 to identify elements of the image 304 contained therein. The interface module 212 can be configured to facilitate training by receiving training images to generate candidate segment masks, ranking the candidate segment masks for accuracy, and inputting one or more masks of the ranked candidate segment masks to the neural network to train the neural network. This process can be iterated to improve accuracy of the neural network. The desired measure of accuracy can be measured by percentage overlap of bounding boxes generated by the neural network from a sample image and the ground-truth bounding boxes for the same image. In some examples, the neural network can be trained by using a ground-truth bounding box as an input and generating candidate segment masks therefrom to train the neural network.

In at least one example, the interface module 212 configured with the neural network can detect elements of the image 304 without input from a user. A user can identify elements of the image 304 in a ground-truth bounding box and provide these to the interface module 212.

In at least one example, the interface module 212 can be configured to produce a signal corresponding to an element 500 appearing in the image 304. The element 500 can be a depicted person(s), thing(s), and/or place(s), In at least one example. For example, FIG. 5 contains element 500, which is a depiction of a bird. The interface module 212 can produce a signal corresponding to the bird depiction, such as audio of a bird song and/or fluttering wings.

In some examples, the element 500 can represent something that has a signal associated therewith. For example, the image 304 can be a scene of a tropical beach including people, the ocean, and palm trees. In such an example, the interface module 212 can identify, such as via a neural network, the people, waves, and palm trees. The interface modulation can produce an audio signal of the babble of a crowd when the detected position 402 corresponds with a location in the image 304 that includes an element identified as "people," can produce an audio signal of waves crashing when the detected position 402 corresponds with a location in the image 304 that includes an element identified as ocean and/or "waves," and the interface module 212 can produce an audio signal of wind rustling in palm trees' fronds when the detected position 402 corresponds with a location in the image 304 that includes an element identified as "palm tree." In some examples, the interface module 212 can cause produce augmented signals. For example, interface module 212 can, via the I/O interface 222, produce humidified and/or warm air to blow upon the object 306 because, even though a tropical breeze may not be identifiable by the interface module 212 as an element in the image 304, the identified elements "people," "waves," and "palm trees" can be associated with a "tropical beach" element of the image 304, which can have an associated signal, tropical breeze. In such an example, a "tropical beach" element can have an associated tactile signal of increased humidity and/or warmth and a breeze.

Other elements appearing in the image 304 having signals associated therewith can include, for example, "cold," "cozy," or "spacious." Signals associated with elements comprising space characteristics, such as "cozy" or "spacious" for example, can be used to auralize other audio signals. As used herein, auralization is the production of sound in a manner that models the acoustics of a certain space and position of a source of sound and a receiver (e.g., listener) of the sound. In at least one example, the interface module 212 can auralize the sound by using stereo signal production and by producing the direct sound with early reflections and late reverberation that model the intended environment.

For example, if the identified elements include "spacious," "marble," and "people" in an image 304, the interface module 212 can produce signals corresponding to "people," "spacious," and "marble" in some examples. In various examples, however, the interface module 212 can produce a signal corresponding to people, such as audio corresponding to the babble of a crowd of people, that is auralized in accord with the elements "spacious" or "marble." In this example, the interface module 212 can use auralization a "spacious" and "marble" environment by producing the direct sound of the babble followed by early reflections that are comparatively late to early reflections of small spaces and that have high amplitude due to the "marble" element, followed by high amplitude late reverberation due to the "marble" element. The effect this has on a listener is that the audio signal of babble sounds as if it is in a large space with sound-reflective walls. Similarly, the interface module 212 can, for an example combination of identified elements such as "indoors." "people," and "cozy," produce audio of the babble of people (due to the identified element, "people) that is more warm and muffled (auralized in accord with the identified elements "indoors" and "cozy") since, due to an appropriate auralization by the interface module 212, there would be less and lower amplitude early reflections and very low amplitude or non-existent late reverberation.

Furthermore, the interface module 212 can multiplex one or more of the image interpretation methods previously discussed and to be discussed below. For example, the interface module 212 can auralize any audio signal produced pursuant to the techniques (e.g., music corresponding to a mood of the image, sonification, sound effects corresponding to elements in the image, verbal description), can modulate channels based on elements 500 of an image 304 (e.g., for an element 500 appearing centrally, in the foreground, and occupying much of the space of the image 304, can dedicate a "lead" instrument track to element 500 so that when the correlated location 406 corresponds with that element 500, the interface module 212 can increase the amplitude of the lead channel), and can use identified elements 500) to contribute to selecting a signal that corresponds well with the image 304.

Illustrative Processes

FIGS. 6-10 illustrate example processes 60X), 700, 800, 900, and 1000, which can be performed in whole or in part and singularly or in any combination.

Figure 6:
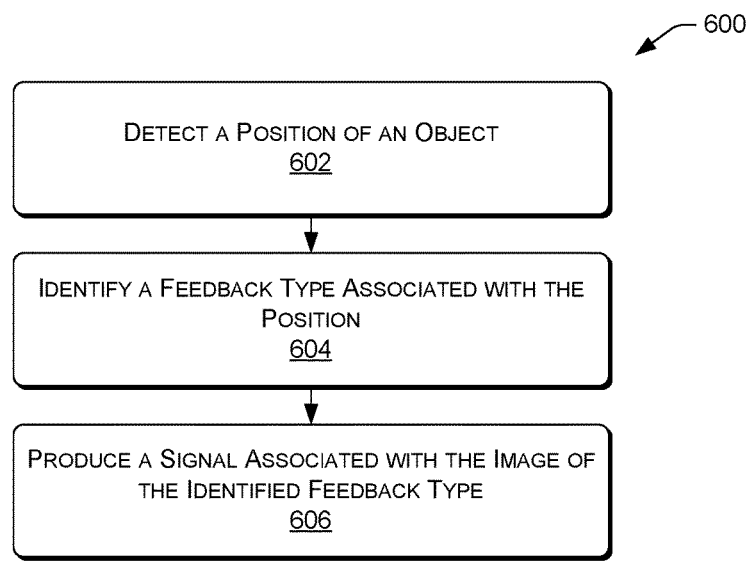
FIG. 6 is a flow diagram illustrating an example process to implement a proxemic interface for interpreting an image.

FIG. 6 depicts an illustrative process 600 of implementing a proxemic interface to interpret images. At 602, the proxemics module 210 detects a position of the object 306, such as according to data received from a sensor.

At 604, the interface module 212 identifies a feedback type associated with the detected position. For example, the interface module 212 can associate one or more feedback types with a position or range of positions (e.g., a zone). In at least one example, the feedback types can include humanly-perceptible signals to assist a low-vision and/or blind person in exploring or interpreting an image. In some examples, the feedback types are signals associated with an image. Examples of feedback types include, but are not limited to, music associated with an image, sonification of an image, sound effects associated with elements in or of the image, and/or information associated with the image. In at least one example, the information associated with the image can be literal and/or aesthetic data for features of the image. Literal features of images can include, for example, image creation information such as authorship, medium, date created, and/or background story, verbal description of the elements of the image such as a location photographed or painted, information on a subject of a photograph or painting, brush strokes used, color characteristics, etc.

Feedback types can be multiplexed, so the interface module 212 can identify more than one feedback type associated with the detected position. In order to identify which feedback type(s) is associated with a position, associations between positions and feedback types can be stored in the data store 214. In some examples, the interface module 212 can modify the associations depending on negative and/or positive user feedback. If behavior of a user exhibits that the associations may not have been correctly estimated, the interface module 212 can modify the associations. For example, if the object includes persons and the process 600 identifies less than the available feedback types because users don't reach a position that is associated with all of the feedback types, the interface module 212 can adjust the associations so that more the other feedback types that aren't being interacted with are associated with more positions than they were previously (e.g., the zones they are associated with the different feedback types can be expanded while the zone of the feedback types that are being used or are more frequently used can be shrunk).

At 606, the interface module 212 can produce a signal associated with the image and of the identified feedback type. For example, the interface module 212 can produce music and/or sounds associated with the image and/or a mood of the image, sonify the image, produce signals associated with elements of the image, and/or produce a signal that provides information associated with the image.

The interface module 212 can produce a signal of a type that provides information associated with the image. In at least one example, the signal can include a verbal description of the image and/or information associated with the image. The signal can include a pre-recorded audio signal of an individual and/or a computer reading information associated with the image and/or the signal can include an audio signal produced by the interface module 212 of machine voicing of text retrieved from the data store 214 and/or from the Internet by the interface module 212 (e.g., machine reading of a Wikipedia article regarding the image, machine reading of popular hashtags associated with the image, machine reading of social media posts regarding the image, etc.).

Figure 7:
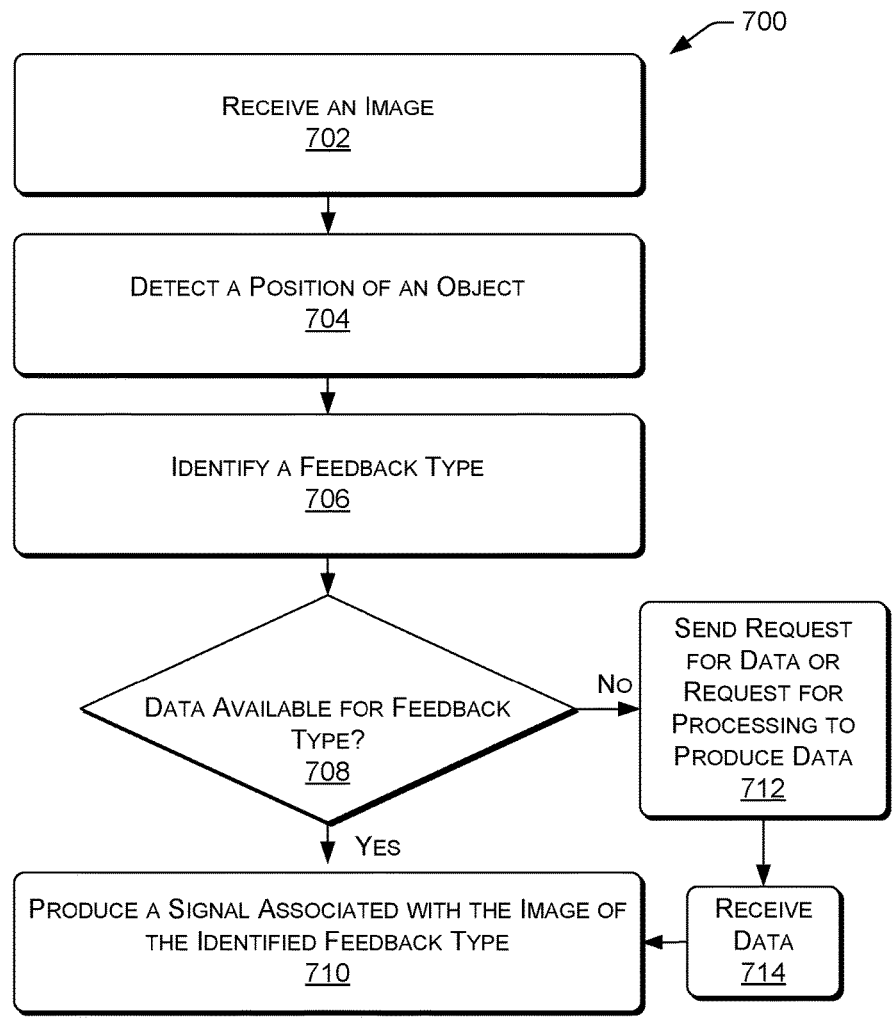
FIG. 7 is a flow diagram illustrating an example process to implement a proxemic interface for interpreting an image.

FIG. 7 depicts an illustrative process 700 of implementing a proxemic interface to interpret images. At 702, the device 200 can receive an image in any manner described herein. In some examples, the device 200 can be agnostic to the image and this step can be omitted. The interface module 212 can be configured with the appropriate feedback without being provided the image. For example, the interface module 212 can statically produce feedback (e.g., by pre-programming the interface module 212) instead of dynamically creating feedback (e.g., by creating the feedback from the image without pre-programming). The device 200 can detect by a sensor that an image is near the object 306 and capture or, optionally, store the image in the data store 214. The device 200 can use element detection methods similar to those discussed above in order to identify that an image is near the object 306. For example, the device 200 can receive data from a camera via the I/O interface 222 and a neural network can segment and identify an image, such as a photograph, painting, and/or display, from the environment. An image can be received from the network interface(s) 222, retrieved from the computer-readable media 204, and/or input by a user.

At 704, the proxemics module 210 can detect a position of the object 306 in any manner described herein, such as according to signals from a sensor. At 706, the interface module 212 can identify a feedback type associated with the detected position in any manner described herein.

At 708, the interface module 212 can check a data store 214 for information and/or data to produce a signal associated with the image of the identified feedback type. In at least one example, if information and/or data is stored in data store 214, the interface module 212 proceeds to step 710. At 710, the interface module 212 can produce a signal corresponding to the identified feedback type. In some examples, the interface module 212 can check cloud resources via the network interface(s) 222, other memory, and/or data received from I/O devices from the I/O interface(s) 220 such as, for example, a MIDI keyboard, DAC, ADC, and/or microphone. In at least one example, if data to produce the signal is not found, at 712, the interface module can send a request for data and/or a request for processing to produce the data.

For example, in order to identify a mood of the image 304 and/or identify information associated with the image, the interface module 212 can conduct an Internet search (e.g., sending a request for search results) and/or a particular website search (e.g., Twitter, Instagram. Wikipedia, Facebook, etc.) that uses a text crawler and/or hashtag crawler to aggregate descriptive words, posts, and/or articles, etc. regarding the image 304. The interface module 212 can find associations between the descriptive words and moods and/or genres of music. The interface module 212 can send a request to artificial intelligence and/or mass human survey resources (e.g., Mechanical Turk Workers) to identify a mood of the image 304 and/or a genre of music that fits the image 304. The interface module 212 can use an identified mood to identify a genre of music that corresponds with the mood. In at least one example, the Music Genome Project and/or similar music classification techniques can be employed and/or searched to identify corresponding music. Requests from the interface module 212 can also be presented.

At 714, the interface module 212 receives data responsive, at least in part, to the request at 712. In at least one example, the interface module 212 can use the received data to produce a signal associated with the image of the identified feedback type at 710.

Figure 8:
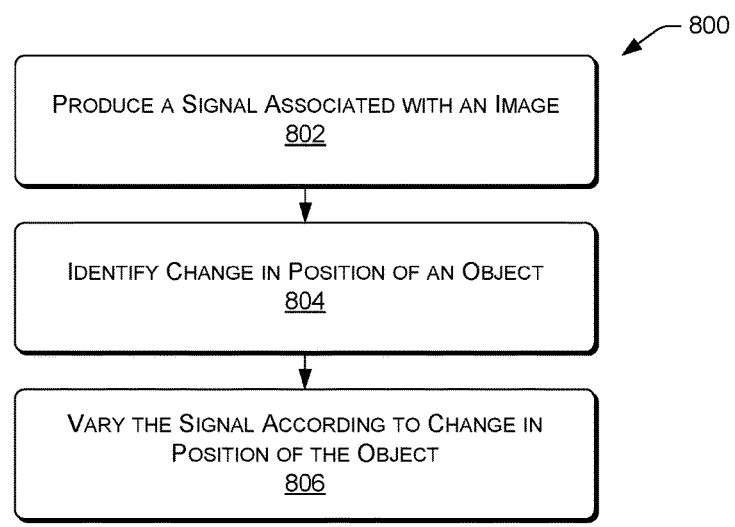
FIG. 8 is a flow diagram illustrating an example process to implement a proxemic interface for interpreting an image.

FIG. 8 depicts an illustrative process 800 of implementing a proxemic interface to interpret images. At 802, the interface module 212 can produce a signal associated with an image in any manner described herein. For example, the interface module 212 can produce music and/or sounds associated with the image and/or a mood of the image, can sonify the image, can produce signals associated with elements of the image, and/or can produce a signal that provides information associated with the image. In some examples, the interface module 212 can produce a multiplexed signal comprising multiple types of signals, such as a signal including sonification of an image using sounds associated with a mood of the image.

At 804, the proxemics module 210 can detect a change in a position of an object in any manner described herein. Based at least in part on this detected change, at 806, the interface module 212 can vary the signal produced. For example, the interface module 212 can change the feedback type completely or it can increase the presence of a feedback type (e.g., based on a change of position, one feedback type can fade while another feedback type increases). In various examples, the interface module 212 can change the auralization of audio signals in a manner that conveys a change in location of the audio signals. For example, the interface module 212 can produce an audio signal corresponding to the sound of wind through the leaves of trees for an image depicting trees and, as a user steps toward an image displaying trees, the auralization of where the sound seems to be coming from can start to shift from in front of a user to beside the user and subsequently behind a user as the user continues to move forward.

Figure 9:
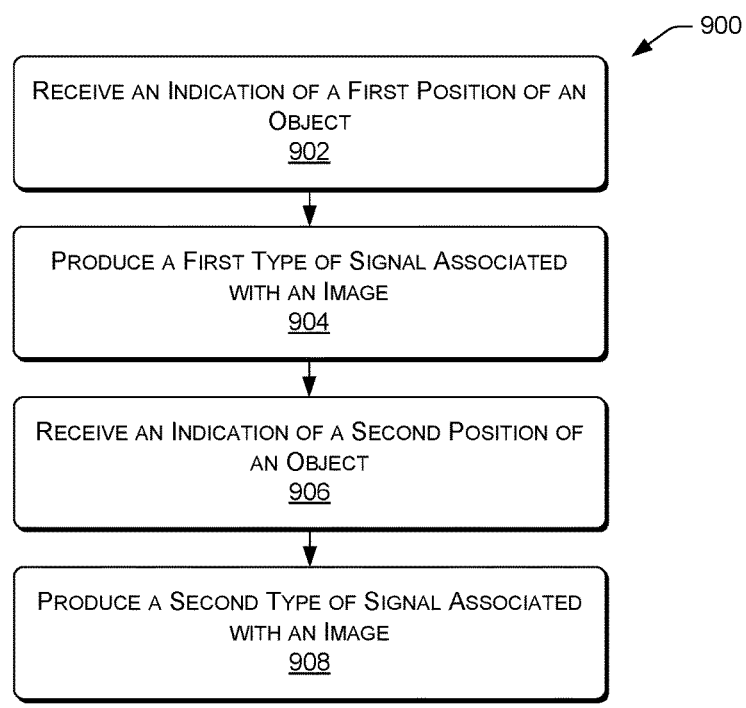
FIG. 9 is a flow diagram illustrating an example process to implement a proxemic interface for interpreting an image.

FIG. 9 depicts an illustrative process 900 of implementing a proxemic interface. At 902, the interface module 212 receives an indication of a first position of an object (e.g., a person, a virtual position, hand(s), gaze, etc.) in any manner described herein. For example, the interface module 212 can receive the indication of the first position of the object from the proxemics module 210. At 904, the interface module 212 can produce a first type of signal associated with an image based at least in part on the indication of the first position of the object in any manner described herein. For example, the interface module 212 can produce one or more of music and/or sounds associated with the image and/or a mood of the image, sonify the image, produce signals associated with elements of the image, and/or produce a signal that provides information associated with the image. In some examples, the interface module 212 can produce a multiplexed signal comprising multiple types of signals.

At 906, the interface module 212 receives an indication of a second position of an object in any manner described herein. At 908, the interface module 212 can produce a second type of signal associated with an image based at least in part the indication of the second position of the object in any manner described herein. For example, the interface module 212 can produce one or more of music and/or sounds associated with the image and/or a mood of the image, sonify) the image, produce signals associated with elements of the image, and/or produce a signal that provides information associated with the image, where the amplitudes of the components of the signal are different than the first type of signal and/or the second type of signal includes different ones of the above-identified types of signals.

Figure 10:
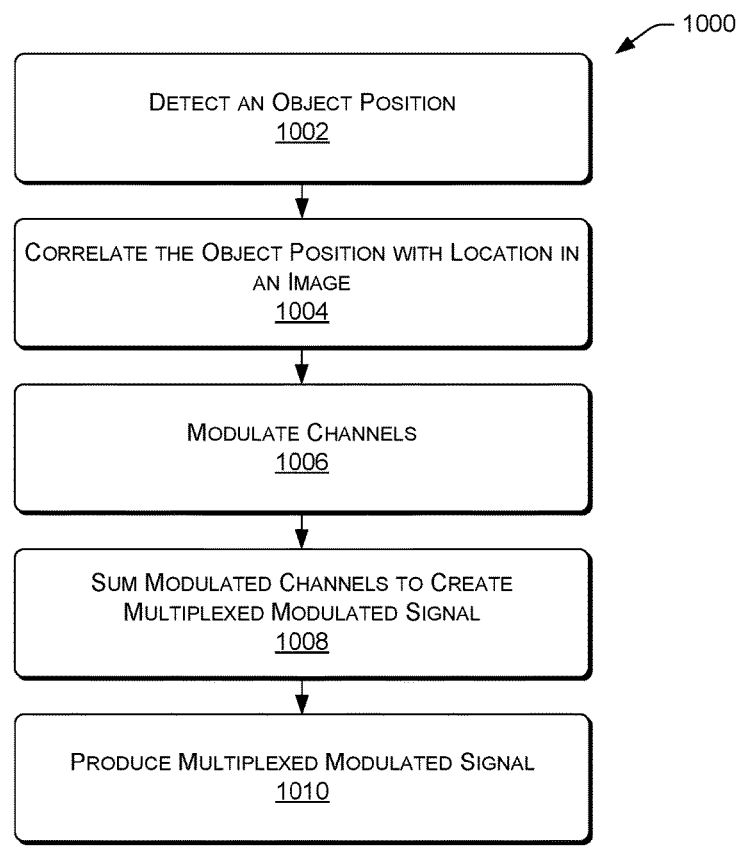
FIG. 10 is a flow diagram illustrating an example process to sonify an image.

FIG. 10 depicts an illustrative process 1000 of implementing sonification of an image. At 1002, the proxemics module 210 detects the position of an object (e.g., a person, a virtual position, hand(s), gaze, etc.). At 1004, the interface module 212 can correlate the detected position of the object with a location in the image in any manner described herein. To accomplish this, the interface module 212 can use any suitable method, such as mapping and/or projection, e.g., to correlate the detected position with a correlated location of the image. In some examples, the image can be resized to the size of the range of detection with or without keeping the original aspect. In some examples, the interface module can display the correlated location over the image.

At 1006, the interface module 212 can modulate channels based at least in part on characteristics of the correlated location in any manner described herein. The characteristics can include color values in at least one example. In various examples, the characteristics can include texture characteristics. Channels can include audio signals and/or tactile signals. In at least one example, channels are instrument tracks. In at least one example, the interface module 212 can modulate amplitude, pitch, tempo, duration, timbre, attack transients, vibrato, envelope modulation, and/or other sonic or musical characteristics of channels.

At 1008, the interface module 212 can sum, aggregate, average, and/or otherwise combine the modulated channels of a similar type (e.g., summing audio channels and summing tactile channels) to create a multiplexed modulated signal (the signal is multiplexed in that it is a summation of multiple signals and is therefore mixed and the signal is modulated in that at least one of the component signals, those signals making up the multiplexed modulated signal, has been modulated prior to production of the multiplexed modulated signal). In some examples, the interface module 212 can multiplex the signal based at least in part on the detected positions of multiple objects (e.g., the detected positions of two body parts, the detected positions of multiple objects such as persons) or provide disparate multiplexed signals for multiple objects (e.g., the interface module 212 can provide one multiplexed signal to one object and a second multiplexed signal to a second object). In various examples, the interface module 212 can produce the multiplexed signals via a private channel to ones of the multiple objects.

At 1010, the interface module 212 can produce the multiplexed modulated signal. In at least one example, to produce the signal the interface module 212 sends the multiplexed modulated signal to an I/O device such as speakers, a touchscreen, Bluetooth, an NFC transmitter, and/or tactile devices (e.g., touchscreen, fan, humidifier, air conditioning).

Example Clauses

A. A system comprising: a sensor; one or more processors; and computer-readable media having stored thereon computer-executable instructions, the computer-executable instructions to configure the one or more processors to: receiving an indication of a first position of an object from the sensor; based at least in part on the indication of the first position, producing a first type of signal associated with an image; receiving an indication of a second position of the object from the sensor; and based at least in part on the indication of the second position, producing a second type of signal associated with the image.

B. The system as paragraph A recites, wherein the first type of signal corresponds to aesthetic features of the image.

C. The system as paragraph A or B recites, wherein the type of second signal corresponds to literal features of and/or information regarding the image.

D. The system as any of paragraphs A-C recites, wherein the second position is closer to the image than the first position.

E. The system as any of paragraphs A-D recites, wherein the first type of signal includes music of a genre corresponding to a mood of the image.

F. The system as any of paragraphs A-E recites, wherein the first type of signal includes at least one of sonification of color values of the image and/or audio corresponding to an object appearing in the image.

G. The system as any of paragraphs A-F recites, wherein the second type of signal includes audio comprising information regarding the image.

H. The system as any of paragraphs A-G recites, wherein a first device includes the sensor and a second device includes the computer-readable media having the computer-readable instructions stored thereon.

I. A device comprising: a sensor; and one or more processors configured to: producing a signal associated with an image; identifying a change in position of an object; and varying the signal associated with the image based at least in part on the change.

J. The device as paragraph I recites, wherein the signal comprises an audio signal including at least one of: a sound associated with a mood of the image, a sonification of the image, a sound associated with an element of the image, and/or information about the image.

K. The device as either paragraph I or J recites, wherein varying the signal comprises changing composition of the audio signal.

L. A method comprising: detecting a position of an object; identifying a feedback type associated with the position, the identified feedback type including an image interpretation tool; producing a signal associated with an image, the signal including the identified feedback type.

M. A method as paragraph L recites, wherein the signal associated with the image comprises an audio signal corresponding to the image.

N. A method as either paragraph L or M recites, wherein the signal associated with the image comprises an audio signal associated with an element appearing in the image.

O. A method as any of paragraphs L-N recites, wherein the signal represents a mood of the image.

P. The method as any of paragraphs L-O recites further comprising, based at least in part on identifying a first feedback type associated with the position: detecting a position of a second object; correlating the position of the second object with a location in the image; determining a color value of the location; based at least in part on the color value, producing a multiplexed modulated signal.

Q. The method as any of paragraphs L-P recites, wherein the multiplexed modulated signal comprises a first signal associated with one of a red value of the RGB value; a second signal associated with a green value of the RGB value; and a third signal associated with a blue value of the RGB value.

R. The method as any of paragraphs L-Q recites, wherein producing the multiplexed modulated signal comprises: amplifying a first signal by a first factor corresponding to a red value; amplifying a second signal by a second factor corresponding to a green value; and amplifying a third signal by a third factor corresponding to a blue value.

S. The method as any of paragraphs L-R recites, wherein the multiplexed modulated signal comprises component signals having amplitudes corresponding to properties of the color value.

T. The method as any of paragraphs L-S recites, wherein the color value of the location comprises properties including at least one of: hue, saturation, brightness, additive primary colors, subtractive primary colors, CMYK colors, and/or RGB colors.

U. A method comprising: receiving an indication of a first position of an object from the sensor; based at least in part on the indication of the first position, producing a first type of signal associated with an image; receiving an indication of a second position of the object from the sensor; and based at least in part on the indication of the second position, producing a second type of signal associated with the image.

V. The method as paragraph U recites, wherein the first type of signal corresponds to aesthetic features of the image.

W. The method as either paragraph U or V recites, wherein the type of second signal corresponds to literal features of and/or information regarding the image.

X. The method as any of paragraphs U-W recites, wherein the second position is closer to the image than the first position.

Y. The method as any of paragraphs U-X recites, wherein the first type of signal includes music of a genre corresponding to a mood of the image.

Z. The method as any of paragraphs U-Y recites, wherein the first type of signal includes at least one of sonification of color values of the image and/or audio corresponding to an object appearing in the image.

AA. The method as any of paragraphs U-Z recites, wherein the second type of signal includes audio comprising information regarding the image.

AB. The method as any of paragraphs U-AA recites, wherein a first device includes the sensor and a second device includes the computer-readable media having the computer-readable instructions stored thereon.

AC. The method as any of paragraphs U-AB recites, wherein the method is implemented by instructions stored on computer-readable media.

AD. The method as any of paragraphs U-AB recites, wherein the method is implemented by a system comprising: a sensor; one or more processors; and computer-readable media having stored thereon computer-executable instructions, the computer-executable instructions configuring the one or more processors to perform the method.

AE. A method comprising: producing a signal associated with an image; identifying a change in position of an object; and varying the signal associated with the image based at least in part on the change.

AF. The method as paragraph AE recites, wherein the signal comprises an audio signal including at least one of: sounds associated with a mood of the image, a sonification of the image, a sound associated with an element of the image, and/or information about the image.

AG. The method as either paragraph AE or paragraph AF recites, wherein varying the signal comprises changing composition of the audio signal.

AH. A method comprising: identifying a position of an object; correlating the position of the object with a location in an image to receive a correlated position; amplifying discrete instrument tracks of a song by factors corresponding to a color value of the image at the correlated position; and summing the discrete instrument tracks to receive a multiplexed audio signal.

AI. The method as paragraph AH recites, wherein pitches of the discrete instrument tracks are maintained.

AJ. The method as either paragraph AH or AI recites, wherein the number of discrete instrument tracks are less than nine.

AK. A computer-readable media having thereon computer-executable instructions to, upon execution, configure a computer to perform a method as any of paragraphs L-AJ recites.

AL. A system comprising: one or more processors; and computer-readable media having thereon computer-executable instructions, the computer-executable instructions to configure the one or more processors to perform a method as any of paragraphs L-AJ recites.

AM. A system comprising: means for processing; means for storing; and means for performing any steps of a method as any of paragraphs L-AJ recites.

AN. A system comprising: means for receiving an indication of a first position of an object; means for producing a first type of signal associated with an image; means for receiving an indication of a second position of the object, based at least in part on the indication of the first position; and means for producing a second type of signal associated with the image, based at least in part on the indication of the second position.

AO. The system as paragraph AN recites, further comprising means for sensing.

AP. The system as either paragraph AN or AO recites, wherein the first type of signal corresponds to aesthetic features of the image.

AQ. The system as any of paragraphs AN-AP recites, wherein the type of second signal corresponds to literal features of and/or information regarding the image.

AR. The system as any of paragraphs AN-AQ recites, wherein the second position is closer to the image than the first position.

AS. The system as any of paragraphs AN-AR recites, wherein the first type of signal includes music of a genre corresponding to a mood of the image.

AT. The system as any of paragraphs AN-AS recites, wherein the first type of signal includes at least one of sonification of color values of the image and/or audio corresponding to an object appearing in the image.

AU. The system as any of paragraphs AN-AT recites, wherein the second type of signal includes audio comprising information regarding the image.

AV. The system as any of paragraphs AN-AU recites, wherein a first device includes the sensor and a second device includes the computer-readable media having the computer-readable instructions stored thereon.

AW. The system as any of paragraphs AN-AV recites, wherein the method is implemented by instructions stored on computer-readable media.

AX. The system as any of paragraphs AN-AW recites, wherein the method is implemented by a system comprising: a sensor; one or more processors; and computer-readable media having stored thereon computer-executable instructions, the computer-executable instructions configuring the one or more processors to perform the method.

AY. A system comprising: means for producing a signal associated with an image; means for identifying a change in position of an object; and means for varying the signal associated with the image based at least in part on the change.

AZ. A system as paragraph AY recites, further comprising at least one of: means for sensing; and/or means for processing.

BA. A system as either paragraph AY or AZ recites, wherein the means for producing a signal comprises means for producing an audio signal including at least one of: a sound associated with a mood of the image, a sonification of the image, a sound associated with an element of the image, and/or information about the image.

BB. A system as any of paragraphs AY-BA recites, wherein the means for varying the signal comprises means for changing composition of an audio signal.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

All of the methods and processes described above can be embodied in, and fully automated via, software code modules and/or computer-executable instructions executed by one or more computers or processors. The code modules and/or computer executable instructions can be stored in any type of computer-readable medium. Some or all of the methods can alternatively be embodied in specialized computer hardware.

Conditional language such as, among others, "can," "could." "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X. Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   a sensor;
   one or more processors; and
   computer-readable media having stored thereon computer-executable instructions, the computer-executable instructions configuring the one or more processors to perform acts comprising:
      receiving an indication of a first position of an object from the sensor, the first position including a first relative distance of the object from an image or the sensor;
      based at least in part on the indication of the first position, producing a first type of signal associated with the image;
      receiving an indication of a second position of the object from the sensor, the second position including a second relative distance of the object from the image or the sensor; and
      based at least in part on the indication of the second position, producing a second type of signal associated with the image.

2. The system of claim 1, wherein the first type of signal corresponds to aesthetic features of the image.

3. The system of claim 1, wherein the second type of signal corresponds to literal features of or information regarding the image.

4. The system of claim 1, wherein the second position indicated by the second indication is closer to the image than the first position indicated by the first indication.

5. The system of claim 1, wherein the first type of signal includes music of a genre corresponding to a mood of the image.

6. The system of claim 1, wherein a first device includes the sensor and a second device includes the computer-readable media having the computer-readable instructions stored thereon.

7. The system of claim 1, wherein the first type of signal includes at least one of sonification of color values of the image or audio corresponding to an object appearing in the image.

8. The system of claim 1, wherein the second type of signal includes audio comprising information regarding the image.

9. A device comprising:
a sensor;
one or more processors configured to perform acts comprising:
producing a signal associated with an image;
identifying a change in position of an object relative to the image; and
varying the signal associated with the image based at least in part on the change in position of the object.

10. The device of claim 9, wherein the signal comprises an audio signal including at least one of: sounds associated with a mood of the image, a sonification of the image, a sound associated with an element of the image, or information about the image.

11. The device of claim 9, wherein varying the signal comprises changing composition of the audio signal.

12. A method comprising:
detecting a position of an object;
identifying a feedback type associated with the position, the identified feedback type including output of an image interpretation tool; and
producing a signal associated with an image, the signal including the identified feedback type.

13. A method as recited in claim 12, wherein the signal associated with the image comprises an audio signal corresponding to the image.

14. A method as recited in claim 12, wherein the signal associated with the image comprises an audio signal associated with an element appearing in the image.

15. A method as recited in claim 12, wherein the signal represents a mood of the image.

16. The method of claim 12 further comprising, based at least in part on identifying a first feedback type associated with the position:
detecting a position of a second object;
correlating the position of the second object with a location in the image;
determining a color value of the location;
based at least in part on the color value, producing a multiplexed modulated signal.

17. The method of claim 16, wherein the multiplexed modulated signal comprises a first signal associated with one of a red value of the RGB value; a second signal associated with a green value of the RGB value; and a third signal associated with a blue value of the RGB value.

18. The method of claim 16, wherein producing the multiplexed modulated signal comprises:
amplifying a first signal by a first factor corresponding to a red value;
amplifying a second signal by a second factor corresponding to a green value; and
amplifying a third signal by a third factor corresponding to a blue value.

19. The method of claim 16, wherein the multiplexed modulated signal comprises component signals having amplitudes corresponding to properties of the color value.

20. The method of claim 19, wherein the color value of the location comprises properties including at least one of: hue, saturation, brightness, additive primary colors, subtractive primary colors, CMYK colors, or RGB colors.

* * * * *